UNITED STATES PATENT OFFICE.

W. H. FARNHAM, OF SPARTA, WISCONSIN.

IMPROVED MEDICINE.

Specification forming part of Letters Patent No. 53,595, dated April 3, 1866.

*To all whom it may concern:*

Be it known that I, W. H. FARNHAM, of Sparta, in the county of Monroe and State of Wisconsin, have invented a new and Improved Medical Compound; and I do hereby declare that the following is a full, clear, and exact description thereof, which will enable others skilled in the art to fully understand and make use of the same.

The present invention relates to a new and improved medical compound to be used for the relief and cure of the asthma, which compound is composed of the following ingredients mixed together in the proportions named, or thereabout, and in the manner as will be hereinafter explained: Nitrate of potash, one and one-half ounce; skunk-cabbage root, two ounces; thorn-apple leaves, two ounces; belladonna, two drams; snake-root, (seneca,) four and one-half drams; snake-root, (black,) four drams; sumac-berries, two and one-half drams; lobelia, (leaves and stalks,) three drams; oil of lavender, forty drops; warm water, one-half pint, all of the above weights being avoirdupois.

First, dissolve the nitrate of potash in the warm water with the proportions of each above named, then thoroughly mix with such solution the remaining ingredients in the proportions stated, first having reduced each of them to a finely powdered or pulverized state, after which spread the compound thus formed upon a pine or other suitable board or surface and subject it to the action of a moderate heat until dry, when it is suitable for use or for being boxed up for transportation or sale.

To use the compound made of the above specified ingredients and in the manner stated, the person, when threatened or suffering with an attack of the asthma, should take one teaspoonful, or thereabout, of it, and placing it upon a plate or other suitable platter, ignite it with a match or in any other proper manner, and then inhale the smoke and vapor arising from it, the person while so inhaling it sitting in an erect or upright position, with the chest and lungs expanded as much as possible, in order that the vapor may be inhaled more freely through the mouth and nostrils, and thus passed or drawn into the lungs. Great relief in most cases will be almost immediately experienced, and after a few similar inhalations the disease will be permanently cured.

Although I have named certain proportions of the several ingredients composing my improved medical compound for the relief and cure of asthma, I do not intend to limit myself to the precise and particular proportions of each named, as they can be varied and yet produce the desired result; but I have found by experiment and actual trial, by using a compound composed of the several ingredients mixed together in the proportions stated, that a sure and permanent cure of the disease for which it is designed to be used is effected, and with but few inhalations, in the manner explained.

I claim as new and desire to secure by Letters Patent—

The medical compound composed of the several ingredients mixed together in or about the proportions stated, and for the purpose specified.

WM. H. FARNHAM.

Witnesses:
 M. A. THAYER,
 M. V. MATTESON.